US009043711B2

(12) United States Patent
Chen et al.

(10) Patent No.: US 9,043,711 B2
(45) Date of Patent: May 26, 2015

(54) MIRRORED FILE MANAGER

(75) Inventors: Yen-Fu Chen, Austin, TX (US); Ta-Wei Lin, Taipei (TW); Chih-Wen Su, Taipei (TW); Shan Su, Taipei (TW); Meng Li Wong, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 11/669,226

(22) Filed: Jan. 31, 2007

(65) Prior Publication Data

US 2008/0183708 A1 Jul. 31, 2008

(51) Int. Cl.
*G06F 17/30* (2006.01)
(52) U.S. Cl.
CPC .... *G06F 17/30884* (2013.01); *G06F 17/30876* (2013.01)
(58) Field of Classification Search
CPC ................................................. G06F 17/30884
USPC ......................................................... 715/747
See application file for complete search history.

(56) References Cited

U.S. PATENT DOCUMENTS

| | | | | |
|---|---|---|---|---|
| 6,049,812 | A * | 4/2000 | Bertram et al. ............... | 715/205 |
| 6,209,027 | B1 | 3/2001 | Gibson ......................... | 709/218 |
| 6,460,060 | B1 | 10/2002 | Maddalozzo et al. ........ | 707/513 |
| 6,490,602 | B1 | 12/2002 | Kraemer ....................... | 715/513 |
| 6,546,397 | B1 | 4/2003 | Rempell ........................ | 702/102 |
| 6,667,751 | B1 | 12/2003 | Wynn et al. ................... | 715/833 |
| 6,742,030 | B1 | 5/2004 | MacPhail ...................... | 707/224 |
| 6,834,372 | B1 | 12/2004 | Becker et al. ................ | 715/501.1 |
| 6,957,390 | B2 | 10/2005 | Tamir et al. ................... | 715/744 |
| 7,013,289 | B2 | 3/2006 | Horn et al. ..................... | 705/26 |
| 7,020,658 | B1 | 3/2006 | Hill ................................ | 707/102 |
| 7,082,573 | B2 * | 7/2006 | Apparao et al. .............. | 715/745 |
| 7,100,120 | B2 | 8/2006 | Zimmerman et al. ........ | 715/777 |
| 7,100,123 | B1 | 8/2006 | Todd et al. ..................... | 715/862 |
| 7,100,195 | B1 | 8/2006 | Underwood ..................... | 762/2 |
| 7,424,476 | B2 * | 9/2008 | Apparao et al. ................ | 707/10 |
| 2004/0034541 | A1 * | 2/2004 | Caban ............................... | 705/1 |
| 2004/0194135 | A1 * | 9/2004 | Kahn .............................. | 725/38 |
| 2005/0240874 | A1 * | 10/2005 | Kiesekamp et al. .......... | 715/745 |
| 2005/0251751 | A1 * | 11/2005 | Feiler ............................ | 715/721 |
| 2005/0268232 | A1 * | 12/2005 | Stienhans et al. ............. | 715/700 |
| 2005/0273718 | A1 * | 12/2005 | Naas .............................. | 715/745 |

OTHER PUBLICATIONS

EditURLs, Assistance & Resources for Computing, Apr. 27, 2005, pp. 1-13.*
Fortt, Big Tech Covering the digital giants, Dec. 18, 2006.*
(Continued)

*Primary Examiner* — Albert Phillips, III
(74) *Attorney, Agent, or Firm* — Schmeiser, Olsen & Watts LLP; William E. Schiesser

(57) ABSTRACT

A file managing software program for managing a list of elements in a specific sequence in a first file of a computer program, including the steps of copying the first file to form a second file having an identical list of elements as the first file. The user is then permitted to rearrange the sequence of the elements of the second file independently of the sequence of the first file. A display of both the first and the second file list elements is provided to the user. Further embodiments allow the user to categorize, prioritize, and order according to users specified rules of how the second file element list is organized and displayed to provide a more convenient and flexible presentation of the file contents.

14 Claims, 19 Drawing Sheets

(56) References Cited

OTHER PUBLICATIONS

Microsoft Visual C# .NET 2003 Developer's Cookbook, Sams, Dec. 17, 2003, pp. 1-8.*
Larry1024, Two ListBoxes-Drag and Drop Example, Code Project, Jan. 18, 2004, pp. 1-6.*
Andrew MacNeil, Using Drag and Drop in your Applications, Jul. 2001, pp. 1-6.*
Granneman, Don't Click on the Blue E!, O'Reilly Media, Inc., 2005, pp. 155-197.*
Removing URL's From Dropdown List, Oct. 15, 2004, 2 pages.*
BLAF Application Guidelines—Shuttle and Reorder, Sep. 18, 2003, pp. 1-15.*
Web site http://www.surfpack.com/software/urladdresses/.
Web site http://www.happycomputing.com/index.php?topic=223.msg883, Nov. 20, 2006.
Web site http://www.ufaq.org/navcom/remvurls.html, Dec. 14, 2004.
Web site http://www.en.wikipedia.org/wiki/URL, Dec. 14, 2006.

* cited by examiner

By Recency and Frequency

[1 day/8 hits] http://www.cnn.com

[1 day / 3 hits] http://www.google.com

[2 day / 9 hits] http://w3.ibm.com

[3 day / 5 hits] http://www.yahoo.com

By Network – Home IP http://www.cnn.com http://www.google.com http://www.espn.com http://www.ibm.com

By Network – Work IP http://w3.ibm.com http://w3.austin.ibm.com http://w3.ibm.com/bluepages http://w3.ausgsa.ibm.com

MIRRORED FILE MANAGER

BACKGROUND OF THE INVENTION

1. Technical Field

The present invention relates in general to a system and method for managing data files, had more specifically, a system and method for providing a convenient display of file contents.

2. Description of the Related Art

Computers with list managing software can be very helpful in managing files having lists of many data elements. However, while many existing applications make use of these lists, existing applications do not provide the user with flexibility in handling either the display or the ordering of data elements of the file lists. An example of such applications is an Internet browser.

The Internet provides a vast resource for commerce and information. To access the Internet, most people use a Internet browser such as Microsoft's Internet Explorer, Netscape, Mozilla Firefox or others. Users of the Internet access different websites by directing their web browsers to the website's Uniform Resource Locator or URL by inputting the URL into the address bar (Internet Explorer) or location bar (Mozilla). The web browser keeps track of the URLs for each of the websites visited. Users can access this list of the visited URL by accessing the list of URLs provided to the address/location bar. This list or history is a stored sequence of all of the URLs that have been accessed by the user. In most Internet browsers, this list of URL addresses is contained in a website address file on the local computer which is maintained in a specific sequence. The user is given very little capability to rearrange or order the contents, directly from the browser or the local website address file.

Web browser users through the existing web browser list manager have the capability to 1) adjust the number of URLs stored by the web browser or 2) the length of time that URLs are stored. Access to this URL list is very convenient for the user since many times, the user needs to again access a previously accessed URL. However, with the exception of deleting a single item on the list, the list manager of web browsers do not allow users to adjust or edit the contents of this list even though, many times, a user would either like to change a URL, or group a URL with other URLs in order to access them more easily. This lack of flexibility makes it difficult for users to efficiently use their web browsers. What is needed is a more flexible file manager to allow users to fully control their URL lists.

SUMMARY

In accordance with the present invention, a method for managing a list of elements ordered in a first sequence in a first file accessed by computer program is provided and includes the steps of copying the first file to form a second file having an identical list of first file elements ordered in the first sequence, next, arranging in response to user commands, the second file list elements in a second sequence in the second file independently of the first sequence, and lastly, displaying at least two of the second list elements in the second sequence by the computer program while displaying at least two first list elements in the first sequence.

In accordance with a preferred embodiment of the present invention, a file manager is provided, that accesses a first file having a list of elements ordered in a first sequence. This file manager then copies this first file to form a second file having an identical list of elements of the first file ordered in the first sequence of the first file. Then in response to user commands, the the file manager then rearrange the file elements of the second file. However, the file elements of the first file are still maintained in the original first sequence and remain in that form. Then the file manager permits the display of at least part of the second list elements in the second sequence designated by the user while displaying at least a portion of the first file list elements in the original sequence.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is a method, system, and computer program product for managing a file list containing individual data elements arranged in a specific sequence. In operation, the file manager makes a copy of a first file list of elements to form a second file having identical elements arranged in identical sequence to the first original file. The file manager then permits the user through user commands to rearrange the sequence of the elements in the second file. Both the first file and the second file may then be displayed to the user. In practice, the user will normally prefer the second file list, since the file elements have been arranged and ordered in a manner that is convenient.

In a preferred embodiment of the present invention, the file manager is configured as a extension or add-on for use with an existing application programs such as Internet browser. In any example of such an Internet browser would be the Mozilla browser provided by the Mozilla Foundation.

An example of the application of the present invention is to access the address bar of the Mozilla Internet browser. As is typical of most Internet browsers, the address bar maintains a list of URL addresses accessed by a user. The ability of the user to change this list is limited. By application of the current invention, a file manager is provided to the user that will enable the user to copy the original list of URL addresses and arranged them in a manner that is more convenient and flexible for the user.

Figure 1:
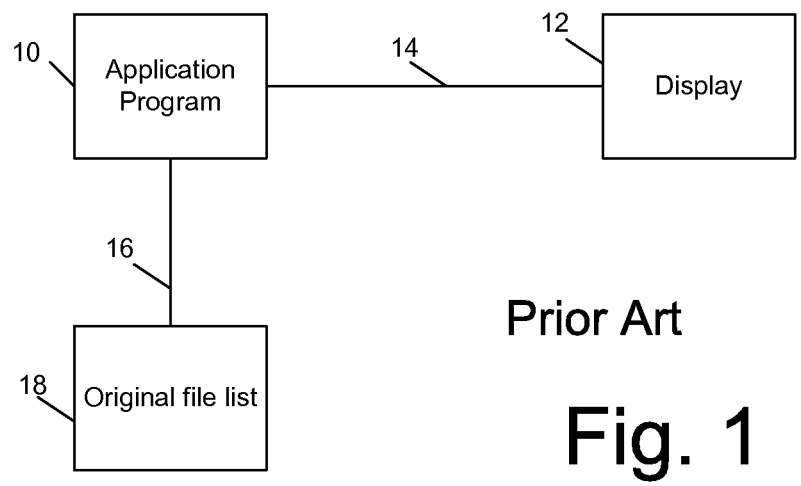
FIG. 1 is a block diagram of the prior art, illustrating an application program accessing a file list for display.

FIG. 1 a simple block diagram of a application program 10 accessing a single file 18 over line 16 in providing a display of the list over line 14 to display 12. This illustrates the existing prior art use and display of the URL address bar.

Figure 2:
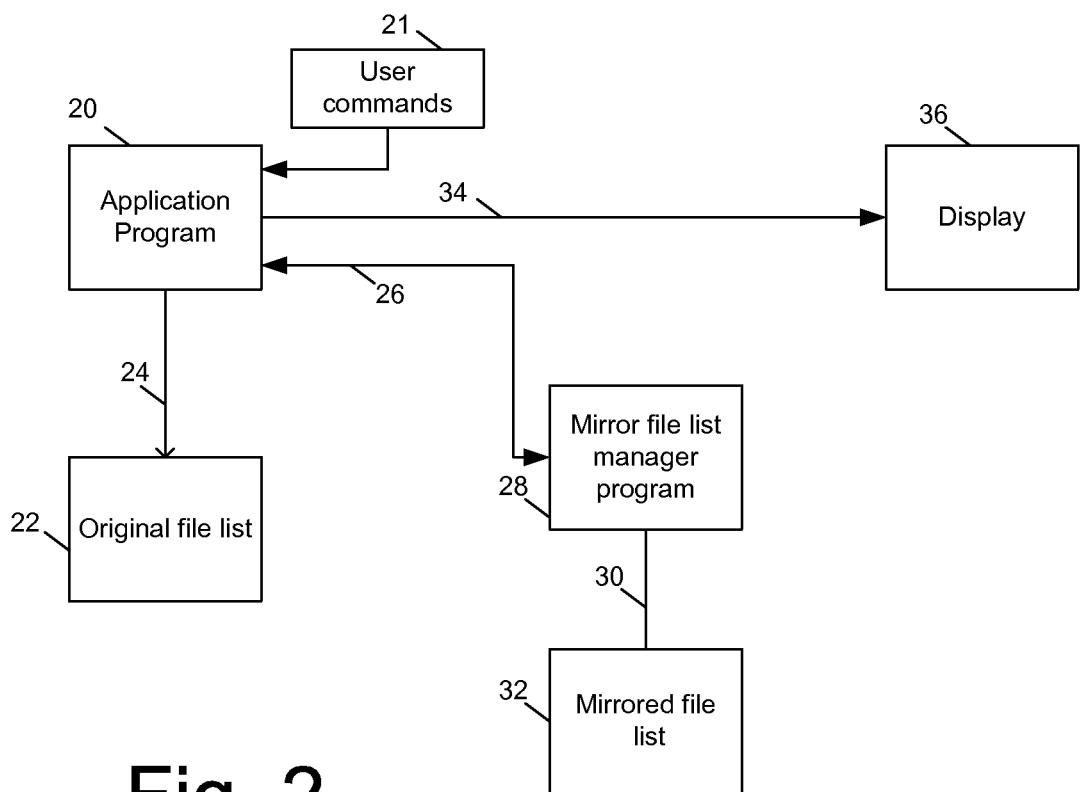
FIG. 2 is a block diagram of the present invention, illustrating the mirrored file manager connected to the application program.

FIG. 2 is a block diagram of the present invention, illustrating a mirrored file list manager program 28, creating a mirror list file 32 over line 30 and providing the beard list file information over line 26 to the application program 20. The application program receives user commands from block 21 which may be a keyboard input to the computer executing the application program 20. These commands may be saved in another file for use later or for export to another user or computer. These user commands will be provided to the mirrored or list file manager 28 on line 26 enabling the user to rearrange or reorganize the elements of the original file list 22 which contains these elements in a first sequence. The user will be able to reorder or rearrange this list of elements in the mirrored file list 32 in any grouping, sequence or other arrangement as desired. This mirrored file list 32 is then provided to the mirrored file list manager program 28 on line 30 to be provided to the application program 20 by line 26 so that the application program 20 may display the reordered list (mirrored list arranged by the user) on display 36 by line 34. In this manner, the present invention has provided the user with a means to more conveniently arrange and display the originally ordered list of the original file in a manner that does not change the original file or its order of elements.

Figure 3:
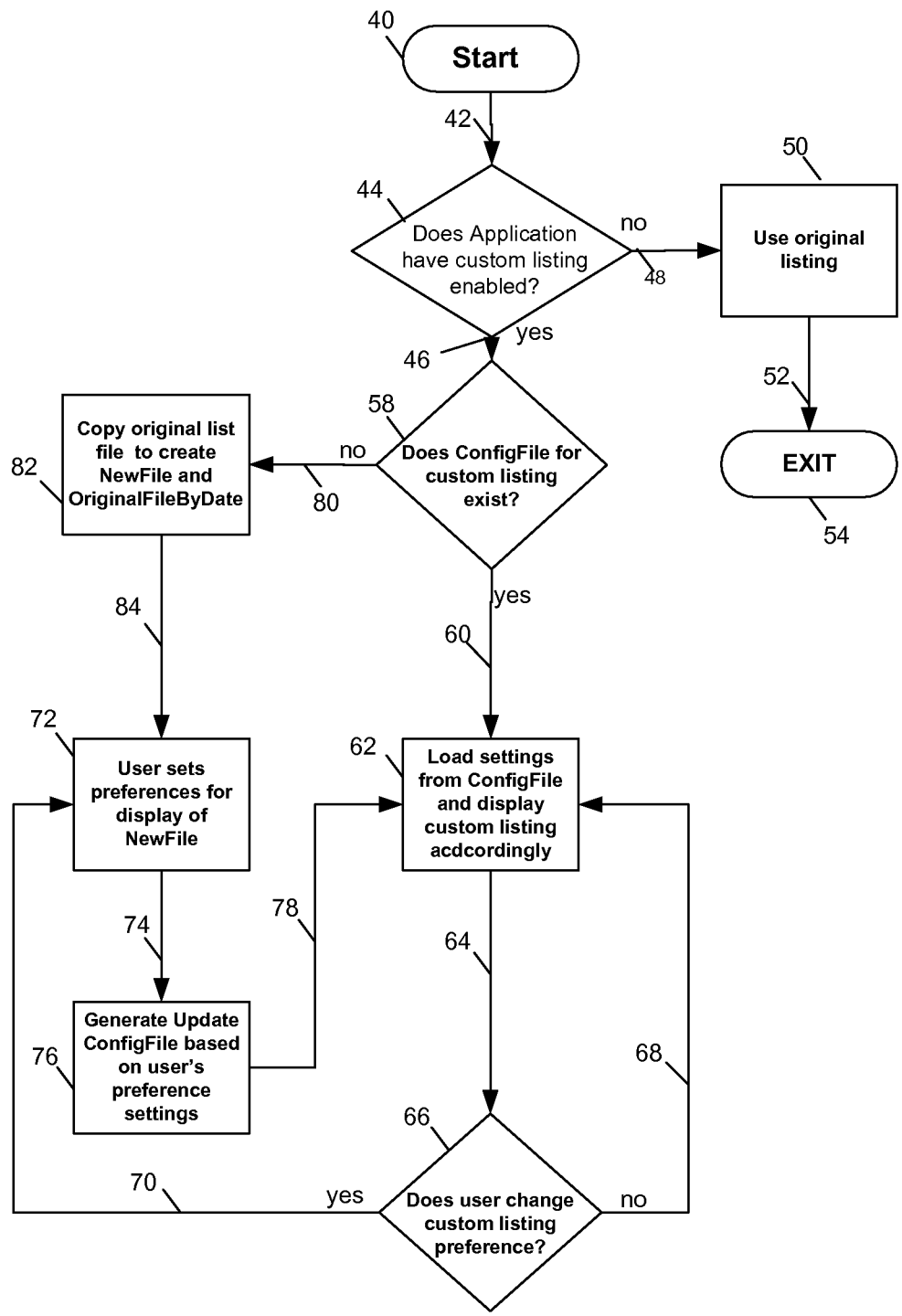
FIG. 3 is a flowchart illustrating the operation of the mirrored file manager software.

FIG. 3 is a flowchart illustrating the operation of the mirrored file manager. As previously discussed, in the preferred embodiment, this program would be a extension for an existing Internet browser such as Mozilla. This extension would take advantage of the user input capability and display capability of the existing Internet browser but would provide additional functionality to the user. Upon starting at location 30, the program precedes on line 42 to a decision element 44 to determine if the custom listing capability is enabled. If not, the program precedes on line 48 to procedure 50, which enables the use and display of the original listing in block 50. Afterwards, the program via line 52 exits at point 54. However, if the application does have a custom listing then the execution of the program precedes over line 46 to another decision 58 to determine if the configuration file exists. If yes, the program proceeds via line 60 to block 62 where the settings from the configuration file are loaded and the display of the list to the user is made accordingly. However returning to decision 58, if the configuration file has does not exist, the execution of the program proceeds over line 80 to block 82 to copy the original list and create the new list in accordance with the user specifications. Then, the execution continues by line 84 to block 72 which provides for the user to set the preferences for displaying the mirrored file (NewFile). The program execution continues by a line 74 to block 76, which generates updates to the configuration file based on the user preferences. Then the program execution continues on line 78 to block 62 where the settings from this new configuration file are then loaded and displayed. The execution in the program proceeds by line 64 to decision 66 to determine if the user has changed the custom listing preferences. If not the program returns via line 68 to block 62 to display the existing settings. However, if the user has changed the custom listing preferences, the execution proceeds via line 70 to block 72 to set the new preferences.

Figure 4:
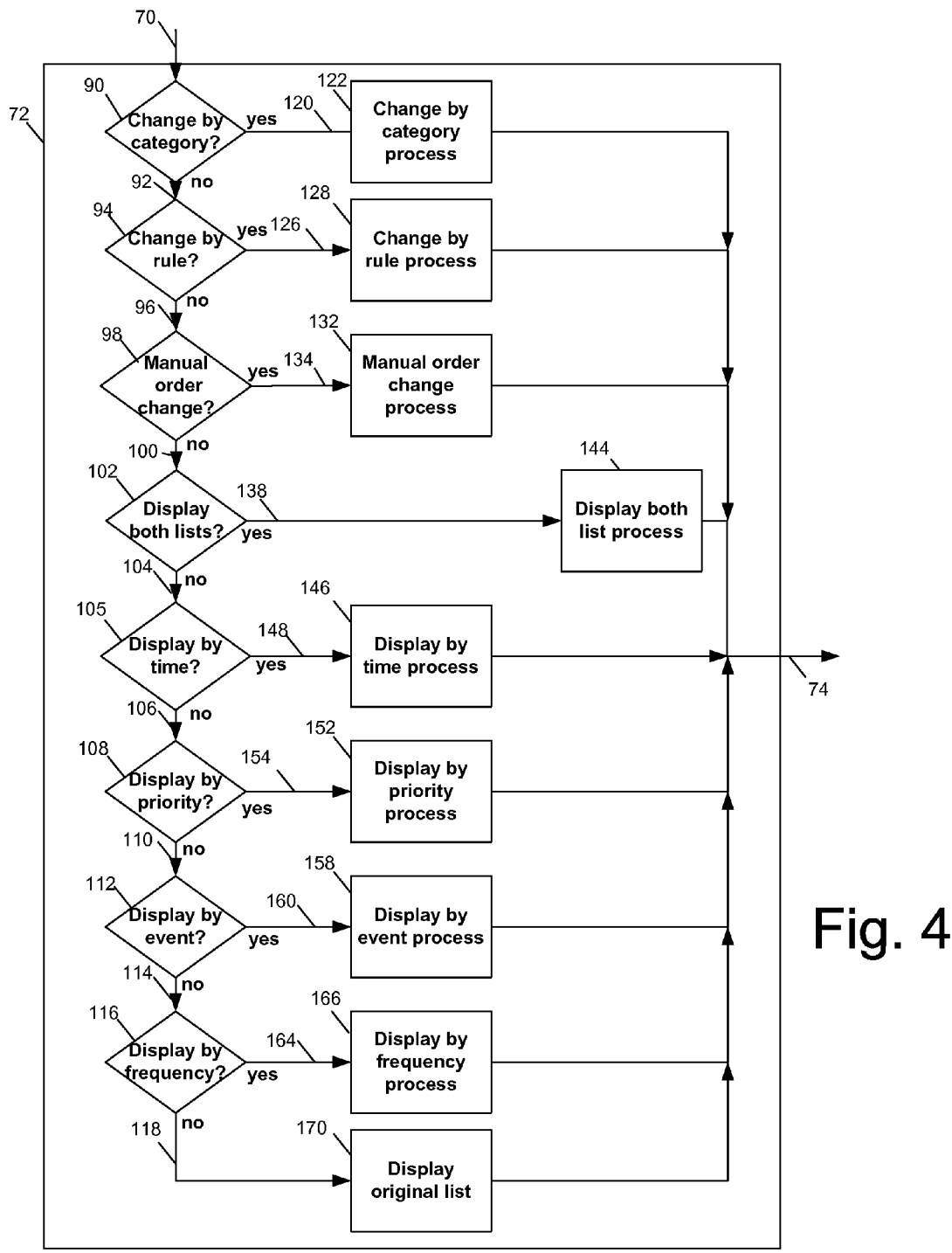
FIG. 4 is a flowchart illustrating the procedure of setting user preferences for the second file.
Figure 9:
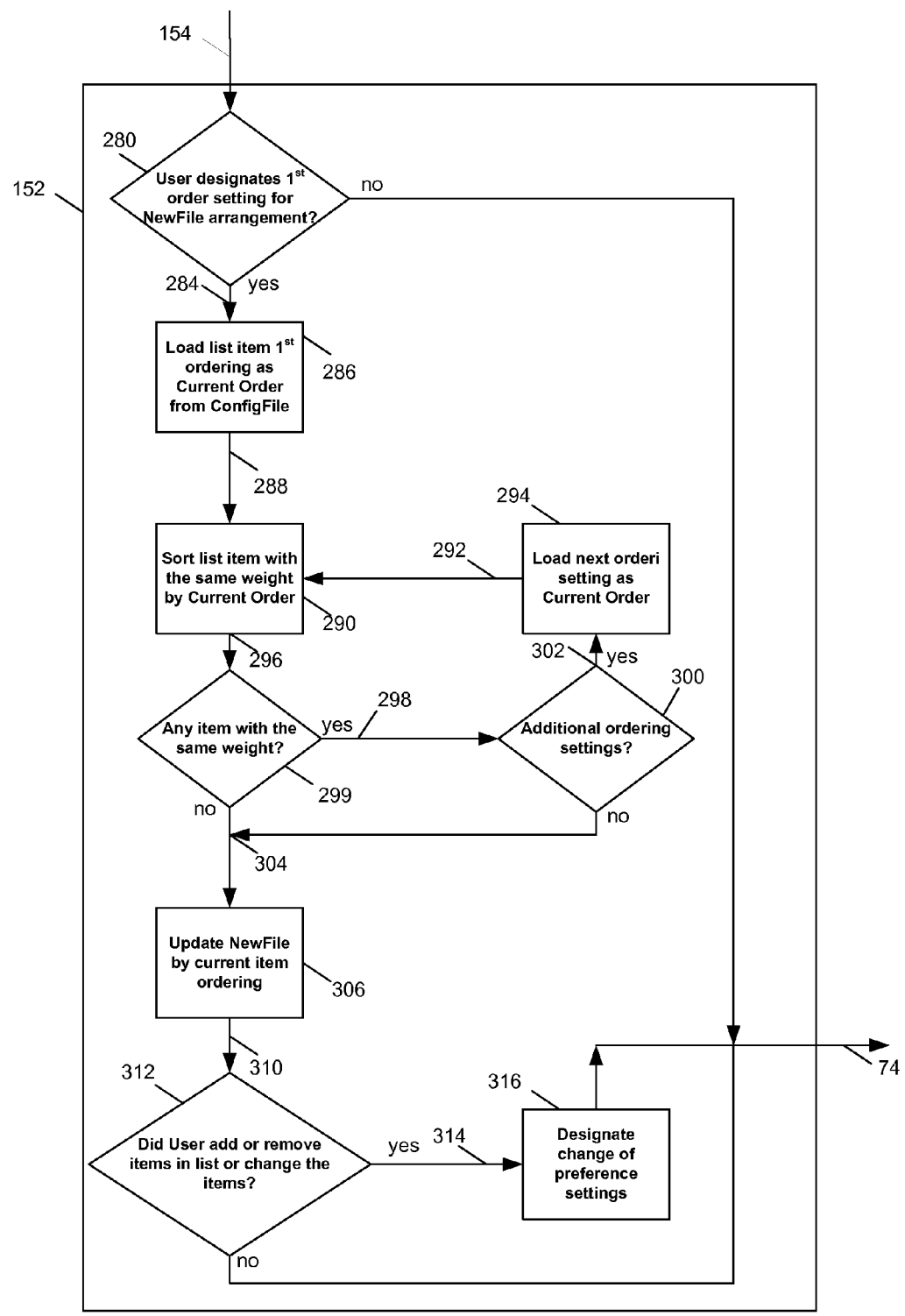
FIG. 9 is a flowchart illustrating the procedure of displaying the list by a weighted priority designated by the user.
Figure 10:
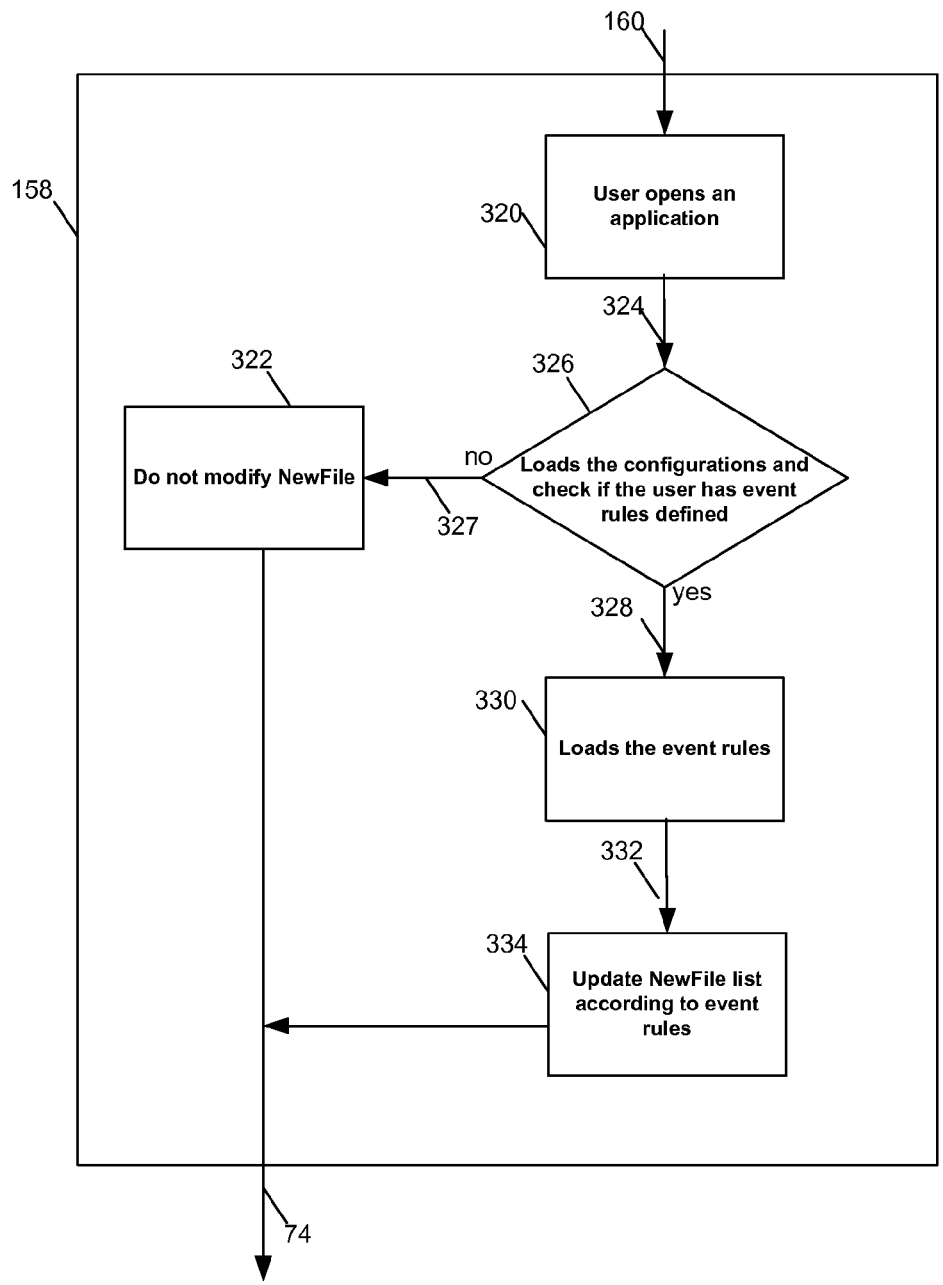
FIG. 10 is a flowchart illustrating the procedure of displaying the list in accordance with the occurrence of an event designated by the user.

In FIG. 4, the operation of the procedure block 72 setting of the user preferences for the mirrored file, is shown. The execution of this procedure begins over line 70 to decision 90 to determine if a user has specified a change in order of listing and display by category. If yes, the program continues via line 120 to block 122 to change the list by the category procedure as is illustrated in more detail in FIG. 8 and then exits that procedure by line 74. If there is no change by category, the execution of the program proceeds on line 92 to decision 94 to determine if the list is to be changed by a rule specified by the user. If yes, the program precedes via line 126 to block 128 to change the list sequence in accordance with the rule specified by the user as is illustrated in more detail in FIG. 13. The program then exits by line 74. If there is no change according to a rule specified by the user, the program execution continues on line 96 to decision 98 to determine if the user has manually changed the order of the elements of the list. If so, the program continues via line 134 to block 132 to change the mirrored list in accordance with the order specified by the user and is illustrated in more detail in FIG. 12. The program then exits via line 74. If the manual order has not been changed, the program precedes via line 100 to decision 102 to determine if the user desires to display both the original list and the mirrored list. If so, the program continues on line 138 to block 144 to display both the lists to the user as is illustrated in more detail in FIG. 5 and then exiting on line 74. If the user does not wish to display the list, the program execution continues by line 104 to decision 105 to determine if the list is to be displayed in a specific order at a specific time. If so, the program execution continues on line 148 to block 146 to display this list in accordance with the order designated by the user at the designated time and which is illustrated in more detail in FIG. 11. The program then exits by line 74. If the answer to the time question is no, the program execution continues on line 106 to a decision 108 to determine if the list is to be displayed by a user specified priority. This would include those web sites that have be designated with specific priorities by the user or as designated with a specified weight that when compared with other designated weights would result in an ordering of the web sites. If yes, the program continues on line 154 to block 152. In block 152, the list is displayed in accordance with a priority set by the user. This is illustrated in more detail in FIG. 6. Also, in an alternative embodiment, the user may assign weights to the different URL addresses and have these addresses prioritized in accordance with their assigned weights and displayed accordingly as is illustrated in FIG. 9. Upon this display, the program then exits via line 74. If the list is not to be displayed by priority, the program continues on line 110 to decision 112 to determine if the list is to be displayed in accordance with an event. If yes, the execution continues on line 160 to block 158 where the display of the list is made in accordance with the user specified event as is illustrated in FIG. 10. The program then exits via line 74. If display by event is not selected by the user, the program execution continues on line 114 to decision 116 to determine if the list is to be displayed by frequency of access. If so, the execution continues on line 164 to line 166 where the list is ordered by frequency and so displayed and illustrated in more detail in FIG. 7. The program then exits by line 74. In this preferred embodiment, if the user does not designate display by frequency then the program continues on line 118 to block 170 to display the list as it was originally formed and exits by line 74.

Figure 5:
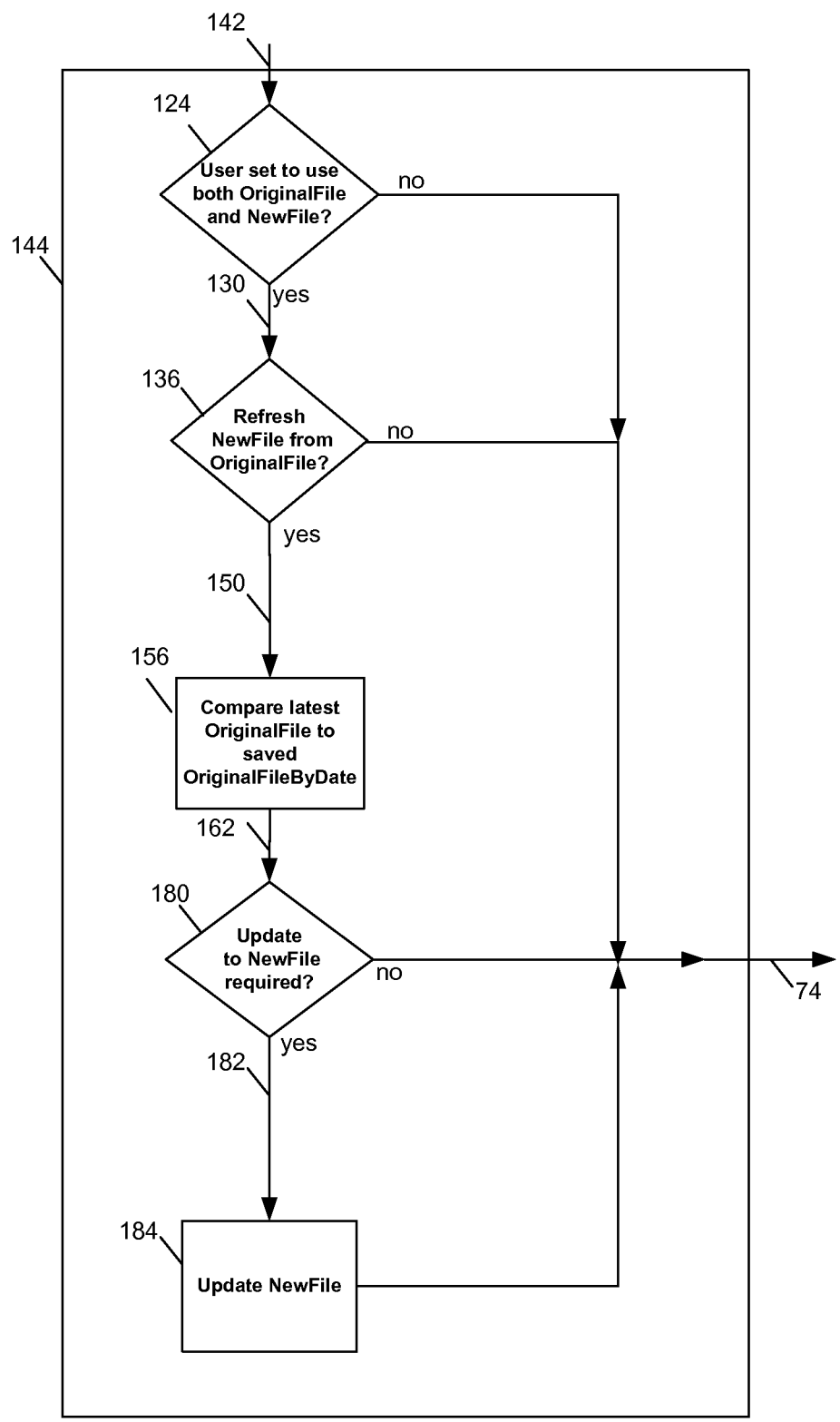
FIG. 5 is a flowchart illustrating the function of displaying both file list to a user.

FIG. 5 illustrates the block 144 procedure of FIG. 4. This procedure displays both the original list and the new list or mirrored list to the user simultaneously. The procedure begins execution on line 142 to decision 124 to determine if the user has designated to use both the original and new lists. If not, the procedure is exited on line 74. However, if so, the procedure determines in decision 136 whether or not the new file is to be refreshed from the original file. If not, the procedure is exited on line 74. However, if the new file is to be refreshed, the program precedes on line 150 to Block 156, to compare the original file with the saved original file by day. Then proceeding by line 162 to decision 180, a determination is made whether or not to update the new file. If no update is required, the procedures is exited on line 74. If an update is required the program proceeds on line 182 to update the new file and block 184, and exits on line, 74.

Figure 6:
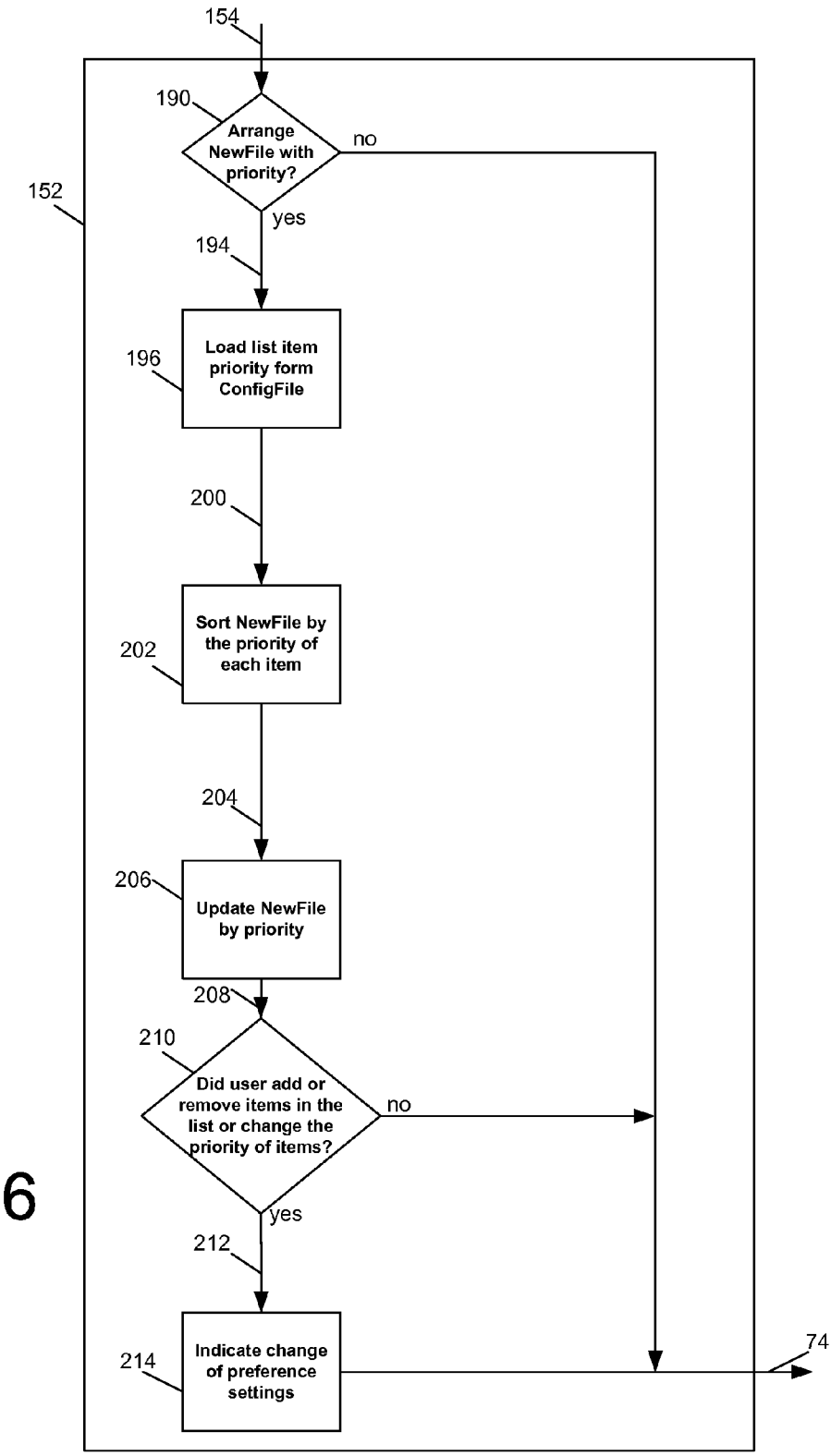
FIG. 6 is a flowchart illustrating the procedure of displaying a list by a user specified priority.

FIG. 6 is an illustration of the display of the list by priority. Entering the procedure on line 154, decision 190 determines whether the new list is to be arranged according to a priority specified by the user. If not, the procedure exits the procedure on line 74. If the new file is to be arranged by a priority, the procedure continues on line 194 to block 196 to load the items designating a priority from the configuration file. The procedure that continues by line 200 to block 202 to sort the list in accordance with the priorities specified. Continuing on line 204 to block 206, the new file is updated accordingly. Then continuing on line 208 to decision 210, it is determined if the user has added or removed or changed priority items. If not the procedure is exited by line 74. However, if alterations have been made, the procedure continues on line 212 to block 214 to indicate the change of preference settings and then exits on line 74.

Figure 7:
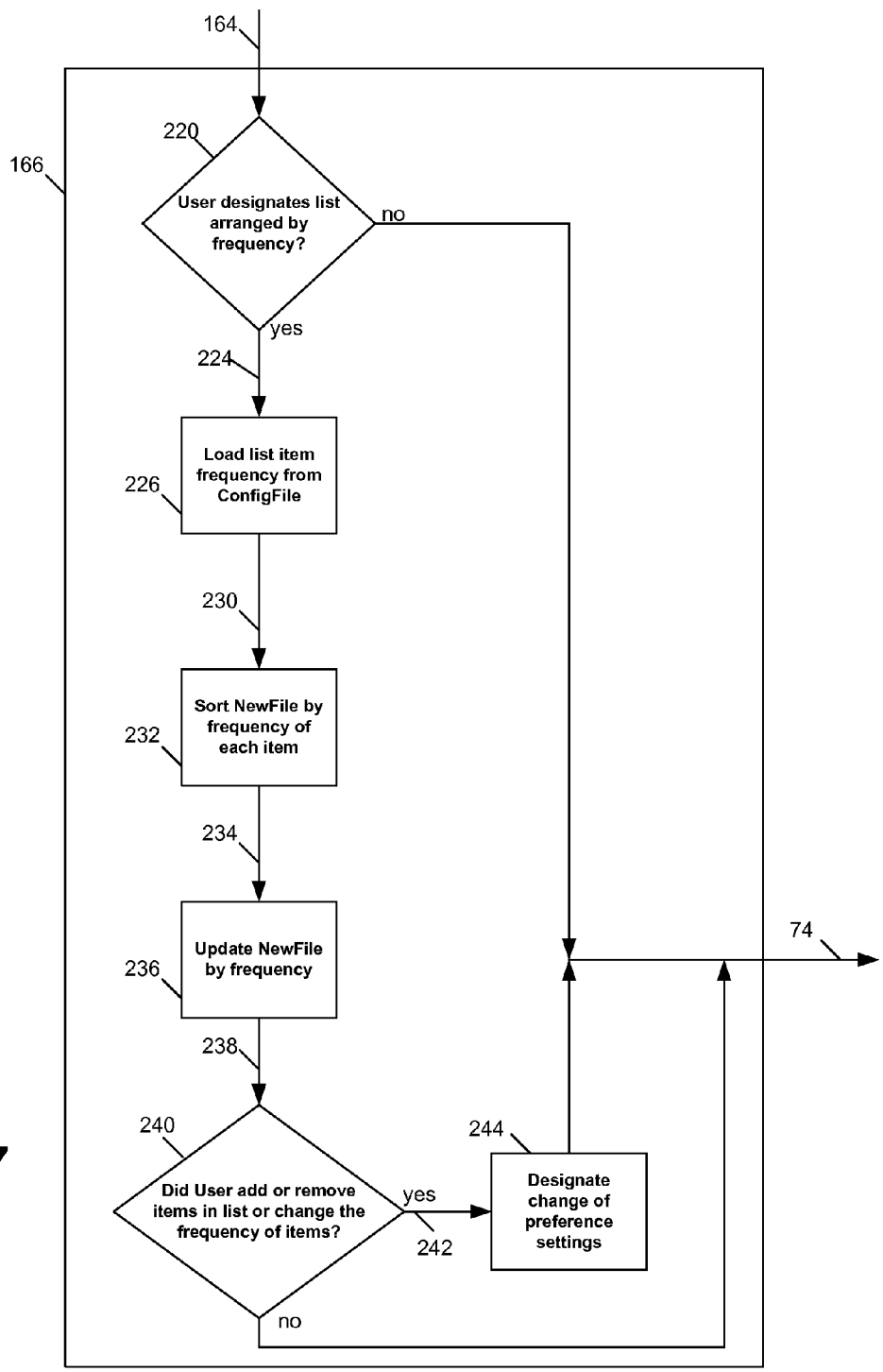
FIG. 7 is a flowchart illustrating the procedure of displaying a list by the user's frequency of access.

In FIG. 7, the procedure for displaying a list by frequency is illustrated. The procedure 168 is entered by line 164 to decision 220 to determine if the user has designated that the list is to be ordered by frequency. If not, the procedure exits by line 74. If the list is to be arranged by frequency, the procedure continues on line 224 to block 226 to list item frequencies from the configuration file. The procedure continues on line 230 to block 232 to sort the new file by frequency of access. The procedure continues on line 234 to block 236 to update the new file by this frequency ordering. Then the procedure continues on line 238 to decision 240 to determine if any items have been added or removed or changed. If so, the procedure continues on line 242 to block 244 to designate the change and exit on line 74. If not, the procedure is exited on line 74.

Figure 8:
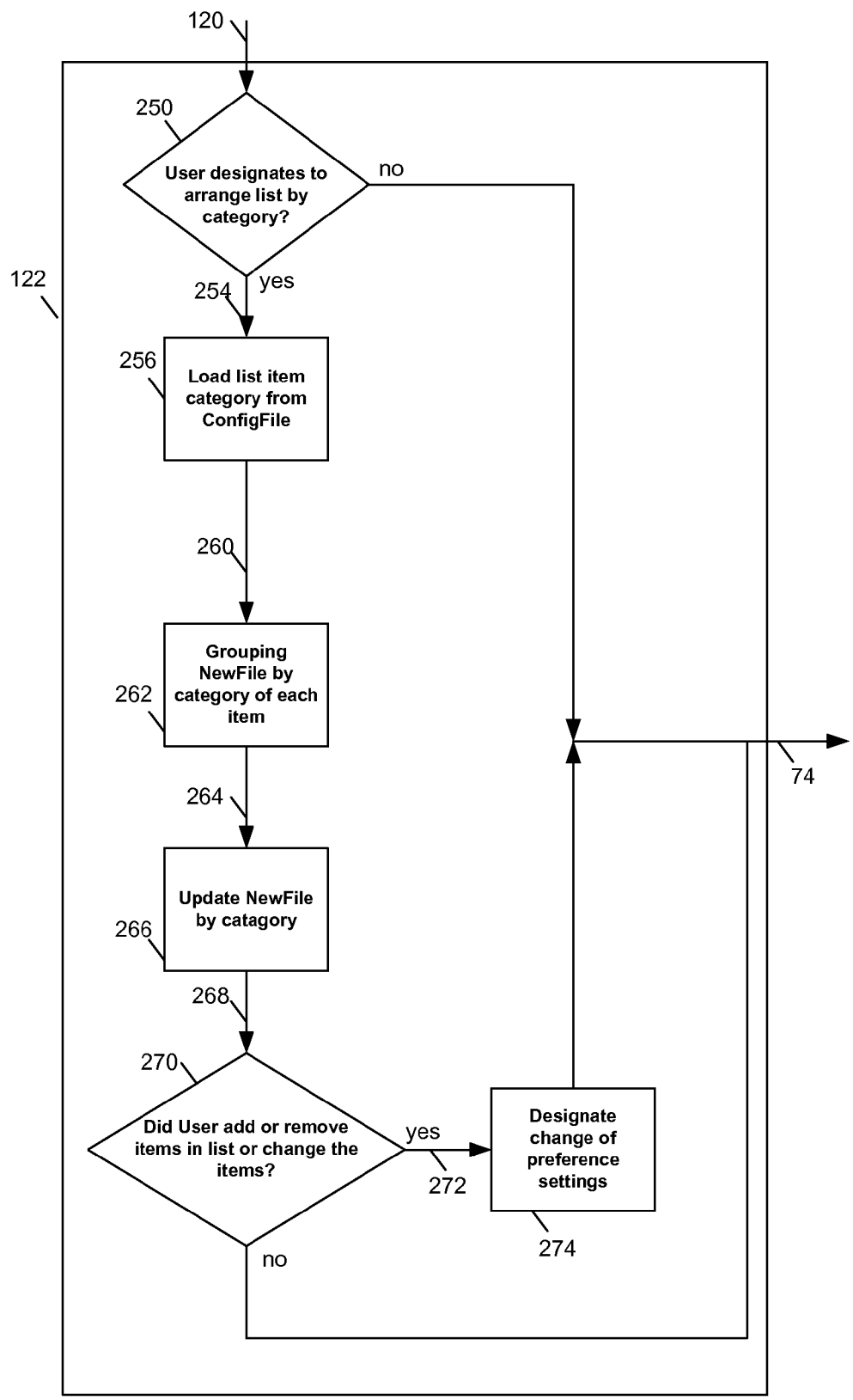
FIG. 8 is a flowchart illustrating the procedure of displaying the list as arranged in categories by the user.

FIG. 8 illustrates the ordering of the list by category as specified by the user. In FIG. 8, the procedure is entered by line 120 to decision 250 which determines whether not the user has designated listing by category. If not, the procedure exits on line 74. However, if the user has designated that the list is to be displayed according to category, the procedure continues on line 254 to block 256 to load the list category items from the configuration file and then proceeds on line 260 to block 262 to group the elements of the new file by category. The procedure then continues on line 264 to block 266 to update the new file. That the procedure continues on line 268 to decision 272 to determine if the user has added, removed or changed any items. If so, the procedure continues on line 272 to block 274 to designate the change of preference settings and the procedure is exited on line 74. If no changes are made by the user in decision to 70, the procedure exits by line 74.

FIG. 9 is an alternative to the display of the list by priority. In FIG. 9, the user may assign weights to each of the list items and then have the list items prioritized in accordance with these assigned weights. The procedure begins by entering on line 154 to a decision 280 to determine if the user designates a first-order setting for the new file. If not, the procedure exits on line 74. Returning to decision 280, if the user has designated a first-order setting arrangement for the new file, the procedure continues on line 284 to block 286 to load the list item first ordering as the current ordering from the configuration file. Continuing on line 288, to block 298, the list is then sorted. Continuing on line 296, to decision 299, it is determined if any of the items have the same weight. If so, continuing on line 298 to decision 300 it is determined if there are other ordering settings. If so, the procedure continues on line 302 to block 294 to load the next weight settings and to return by line 292 to block 290 to sort by those settings. Returning to decision 300, if no additional settings are present, the procedure continues by line 304 to block 306 returning to block 299. If no items are of the same weight, the procedure continues on line 304 to block 306, which updates the new file by the current item ordering. The procedure they continues by line 310 to decision 312 to determine if the user has made any changes, additions or removals of items. If so, the program continues on line 314 to designate the change of preference setting and then exits on line 74. Returning to decision 312 if no changes have been made, the program then exits on line 74.

FIG. 10 illustrates the ordering of the list for display when a user specified event occurs. This procedure 158 of FIG. 4 is entered by line 160 to block 320 to determine if the user has opened the application. In this embodiment, this is an example of a type of event that might be designated by the user to change the listing of the URL addresses provided to the browser. This would be done so that the user when using a specific application could conveniently access selected server web sites. Continuing on line 324 to decision 326 the configurations are loaded and checked to see if the user event rules have been defined. If no, the procedure continues on line 327 to block 322 to not modify any of the settings or the URL listings and then exits on line 74. However, returning to decision 326, if the configurations have been loaded and event rules defined, the procedure continues on line 328 to block 330 to load the event rules. Continuing on line 332 to block 334, the new file is updated according to the event rules. The procedure then exits on line 74.

Figure 11:
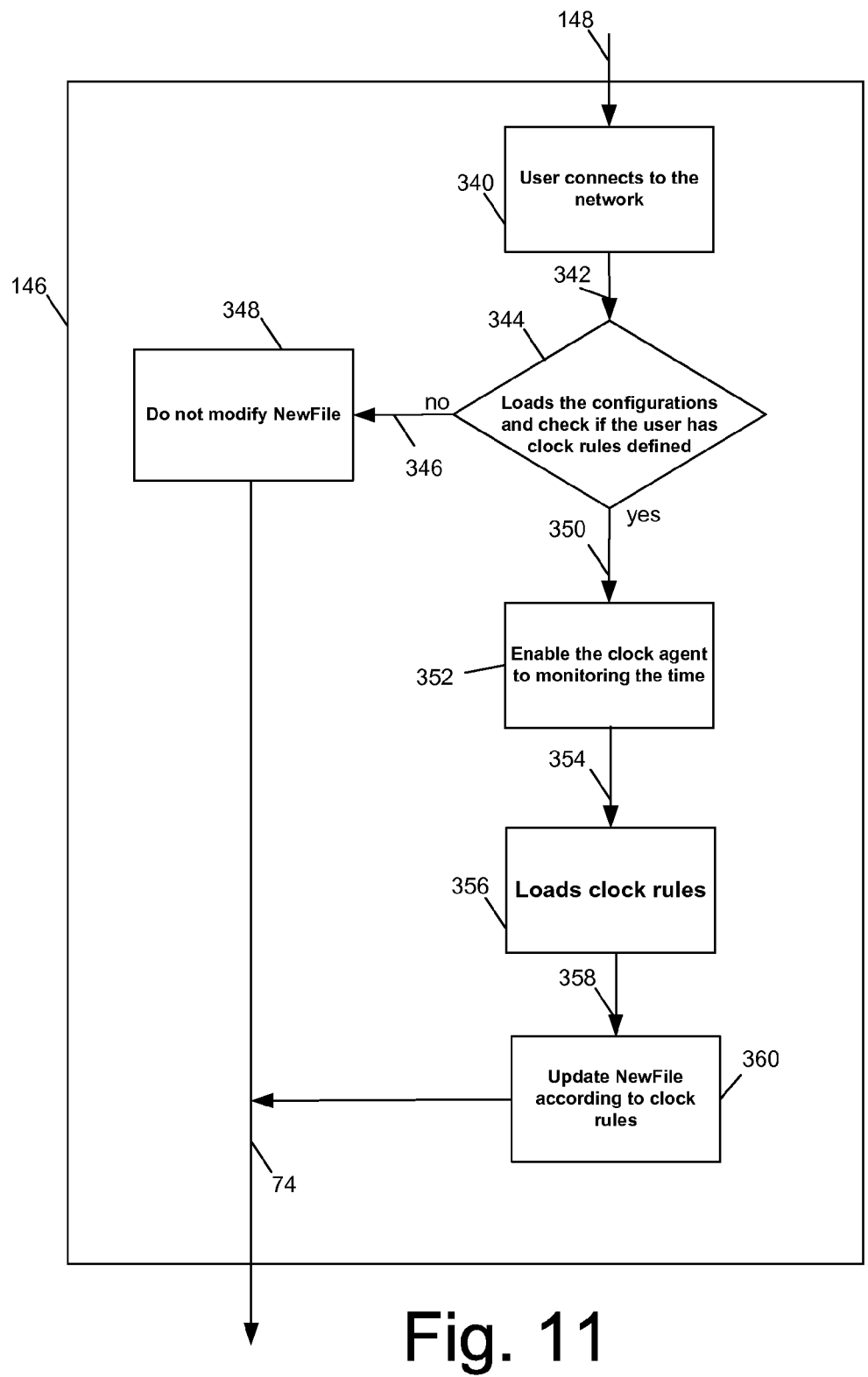
FIG. 11 is a flowchart illustrating the procedure of displaying a list in order designated by the user in accordance with the present time.

FIG. 11 is an illustration of the procedure whereby the list is ordered from the user configuration to be displayed at a specific time. In other words, the user may specify in a certain time of day that a certain list of URLs be provided. An example would be during work time, certain work related URLs would be displayed whereas during leisure time, a different list of URLs may be displayed. Referring to FIG. 11, this procedure 146 of FIG. 4, is entered by line 148 to block 340 to connect the user to the network. Then continuing on line 342 to decision 344 the procedure loads the configurations and checks to see if the clock rules have been defined. If not, the procedure continues on line 346 to block 348 where the new file is not modified and the procedure exits on line 74. Returning to decision 344, if the clock rules have been defined, the procedure continues on line 350 to block 352 to enable the clock agent to monitor the time. Continuing on line 354 to block 356, the clock rules are loaded. Continuing on line 358, to block 359, the new file is update according to the clock rules. The program exits on line 74.

Figures 12, 13:
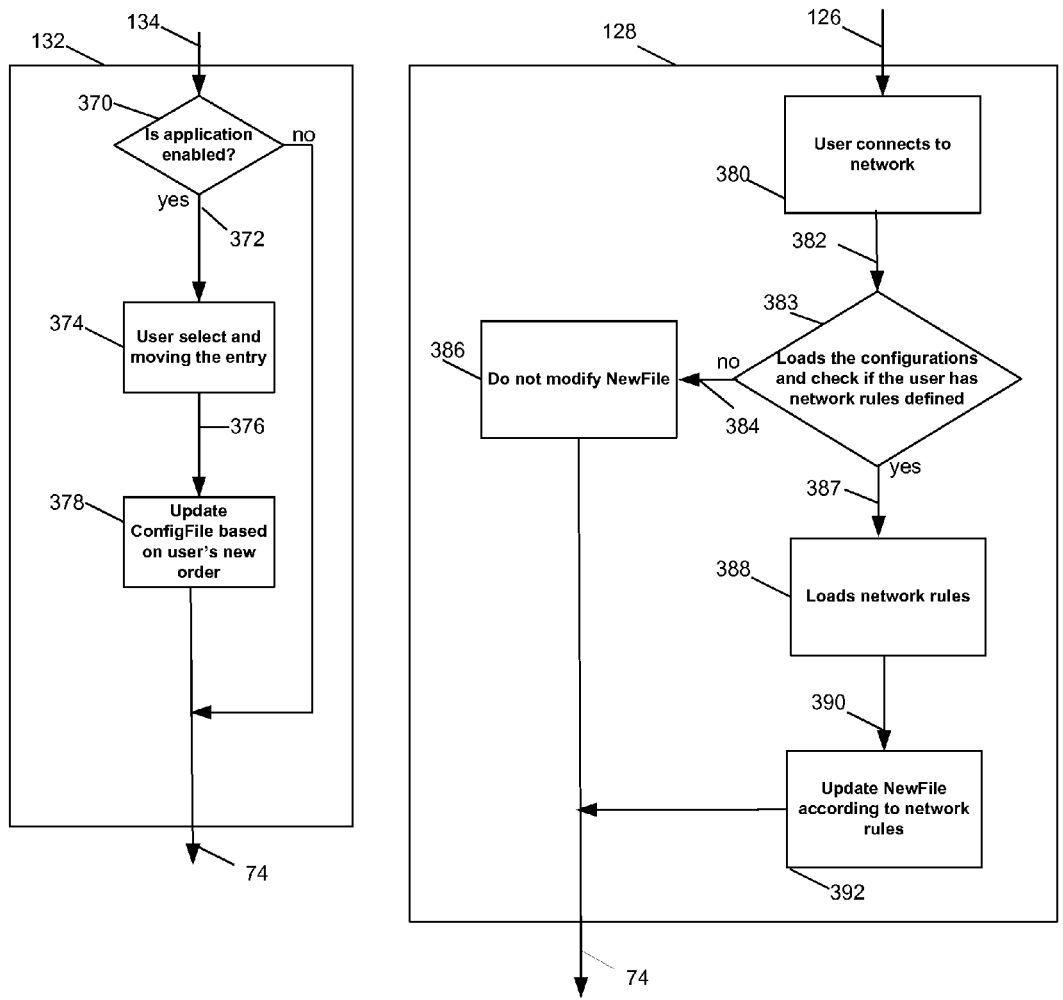
FIG. 12 is a flowchart illustrating the procedure of displaying a list in a manually configured order from the user.
FIG. 13 as a flowchart illustrating the procedure of displaying a list in accordance with a users specified rule arrangement.

FIG. 12 is the procedure 132 that is executed when the user manually changes the order listing URL addresses in the new list. The procedure is entered on line of 134 to decision 370, which determines whether the application has been enabled. If not the procedure is exited online 74. However, if it has been enabled, then the procedure continues on line 372 to block 374 to determine the user selection and movement of entries and continues on line 376 to block 378 where the configuration file is updated for this new list in accordance with the user's new order. The procedure is exited online 74.

FIG. 13 illustrates the reordering of the new file listings in accordance with rules specified by the user. In FIG. 13, the procedure 128 of FIG. 4, is entered by line 126 to block 380 which connects the user to the network. Continuing on line 382 to decision 383, the configuration is loaded and checked to see if the rules have been defined by the user. If not, the procedure continues on line 384 to block 386 where the new file is not modified. The procedure exits on line 74. Returning to decision 383, if new rules have been defined, the procedure continues on line 387 to block 388 to load the new rules. Continuing on line 398 to block 392, the new file is updated according to the network rules. The procedure then exits on line 74. An example of network rules is when a computer is connected to a company internal network or intranet then the history list display would a list applicable to the websites one would desire to access on that network. Alternatively, if the computer was connected to the internet and not to the company intranet, then the list of internal company websites would not be useful and should not be displayed.

It should be apparent to one skilled in the art that the configuration of the number of lists displayed and the number of items displayed in a list would be a user defined.

In another alternative embodiment, when the original list or 'first' list is the basis for the creation of the 'second' list by performing the editing, grouping and/or display actions previously discussed, the user may use either the 'first' list again to create another 'second' list or use a previously produced 'second' list. In other words, while these 'second' lists may contained the same list elements, the list display themselves would be unique according to the criteria used to produce them. Thus the user is given almost unlimited capabilities to produce the lists in any manner deemed useful.

Figure 14:
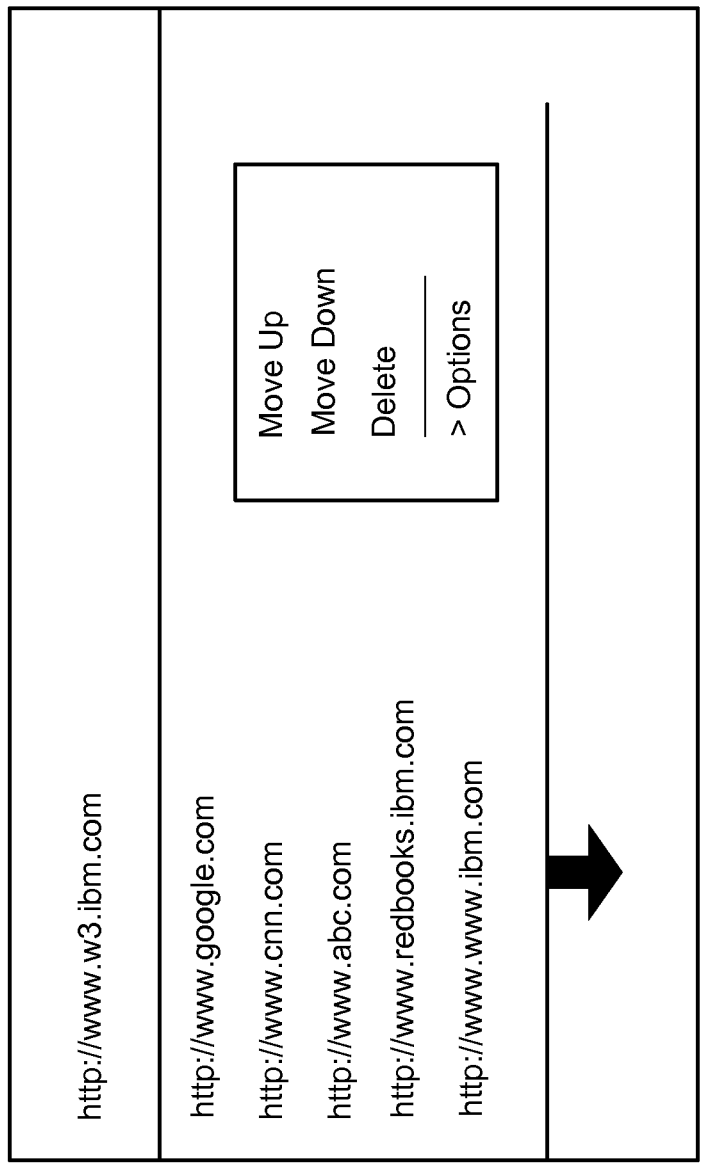
FIG. 14 is an illustration of a drop-down menu arrangement, illustrating a list together with user menu commands.

FIG. 14 illustrates a drop-down display of the URL addresses. This drop-down display includes a display of commands provided to the user and which enable the user to change the order of the URLs listed or to delete the URLs or, if so desired, provide other options to the user on a location adjacent to the list elements to be modified.

Figure 15:
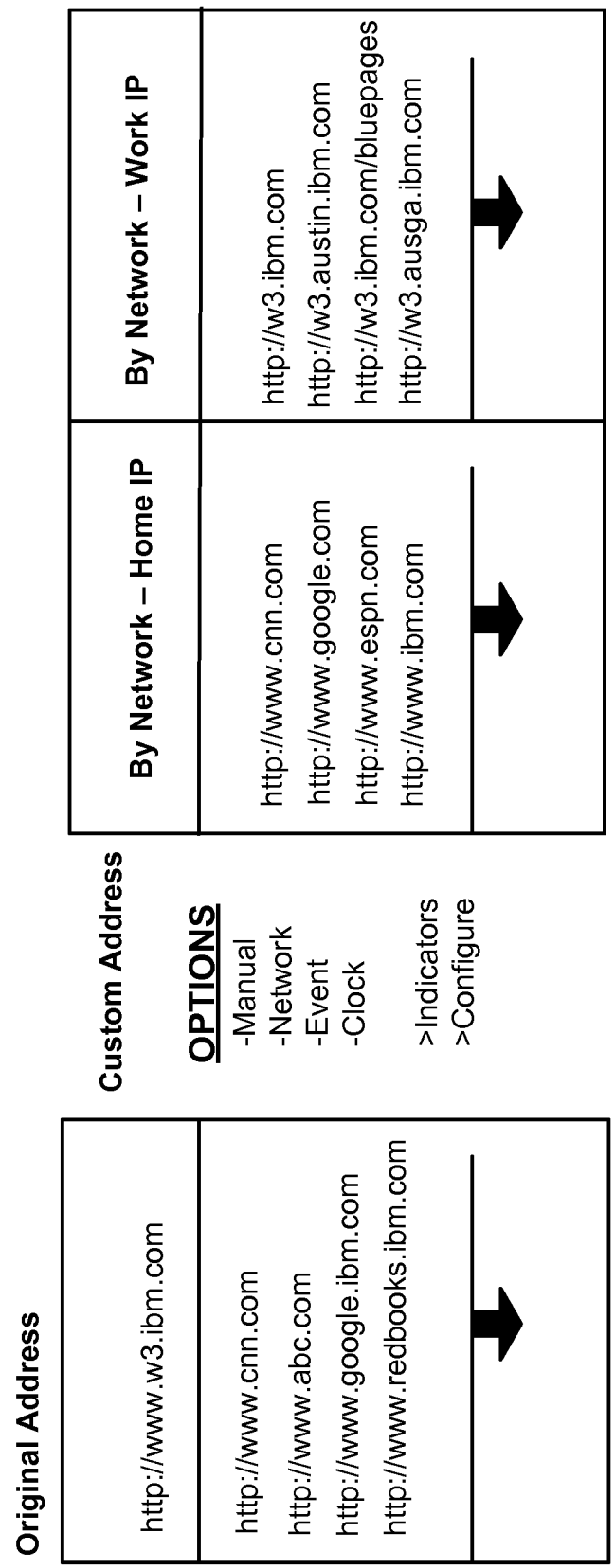
FIG. 15 is an illustration of the display of both the original list and the user modified list.

FIG. 15 illustrates the dual display, having the original URL file listing on the left displayed simultaneously with the user configured new file containing the URL listings as configured by the user.

Figure 16:
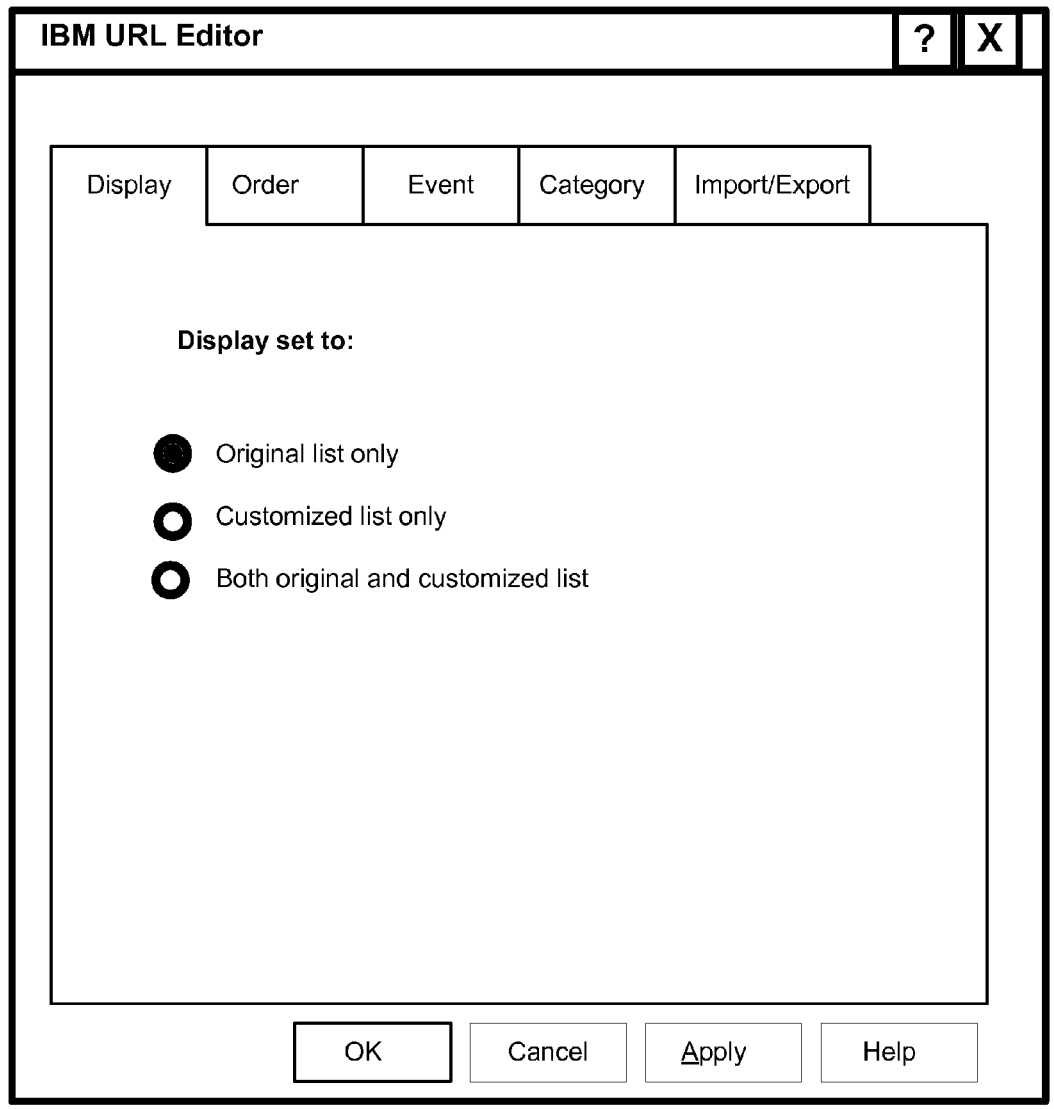
FIG. 16 is an illustration of a user window display for altering the lists.

FIG. 16 is an illustration of one display of the command window that will enable the user to take the new file (mirrored file) and configure it as the user desires.

Figure 17:
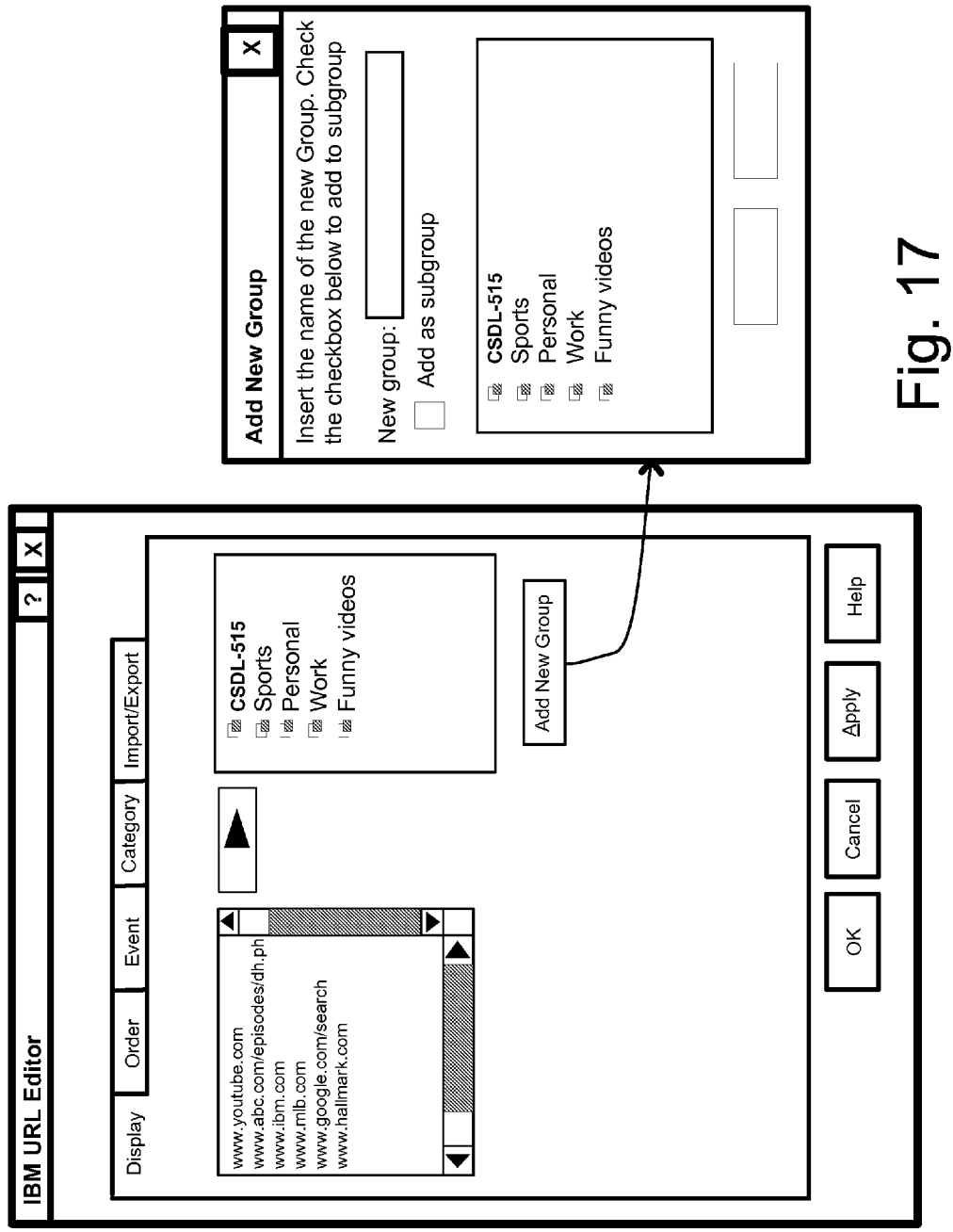
FIG. 17 is an illustration of the windows displayed for the category and grouping procedure.

FIG. 17 illustrates the commands displayed to the user for placing the URL addresses into categories.

Figure 18:
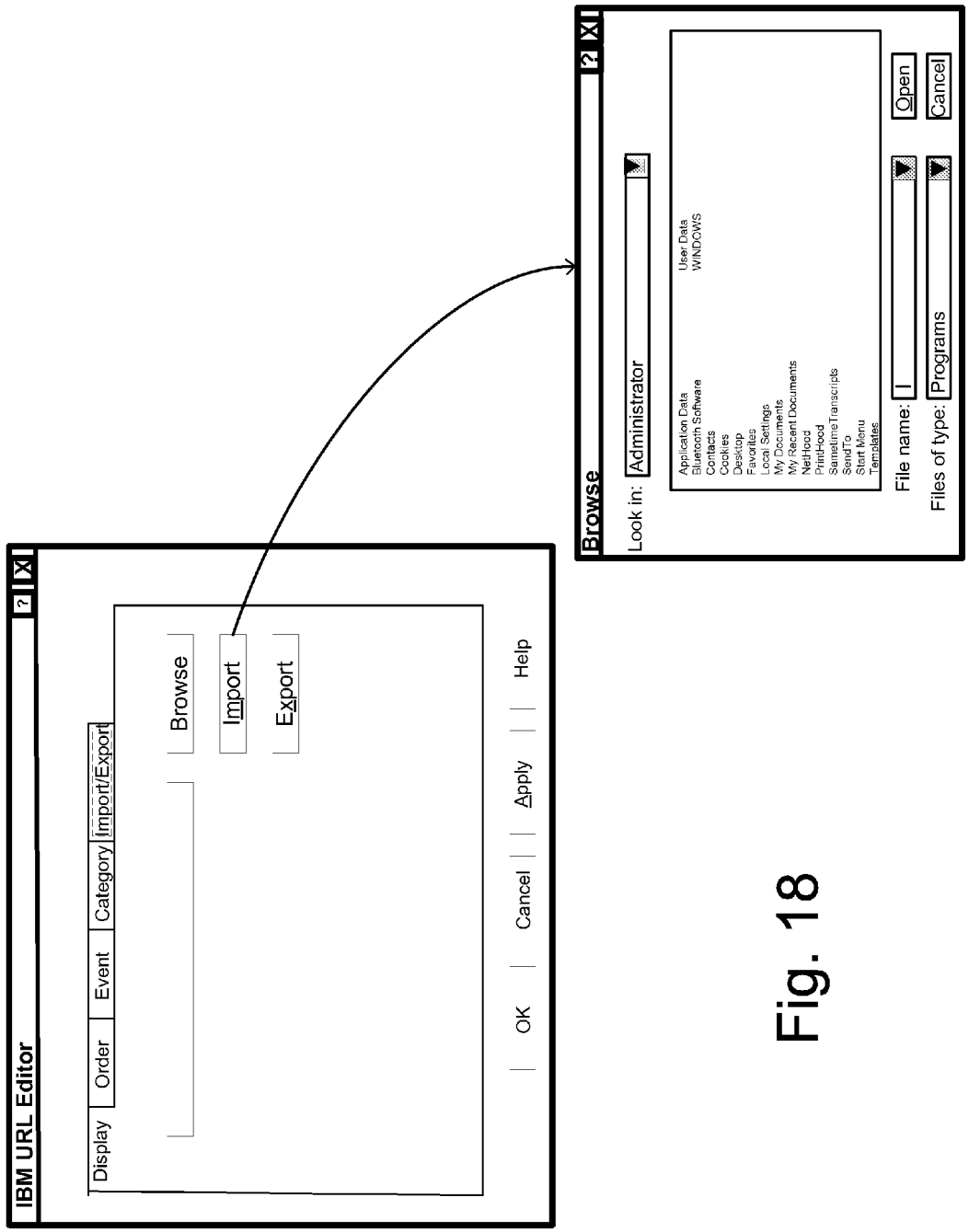
FIG. 18 is an illustration of the window display for importing a list configuration.

FIG. 18 illustrates the commands provided to the user when the user is importing a configuration for URL display.

Figure 19:
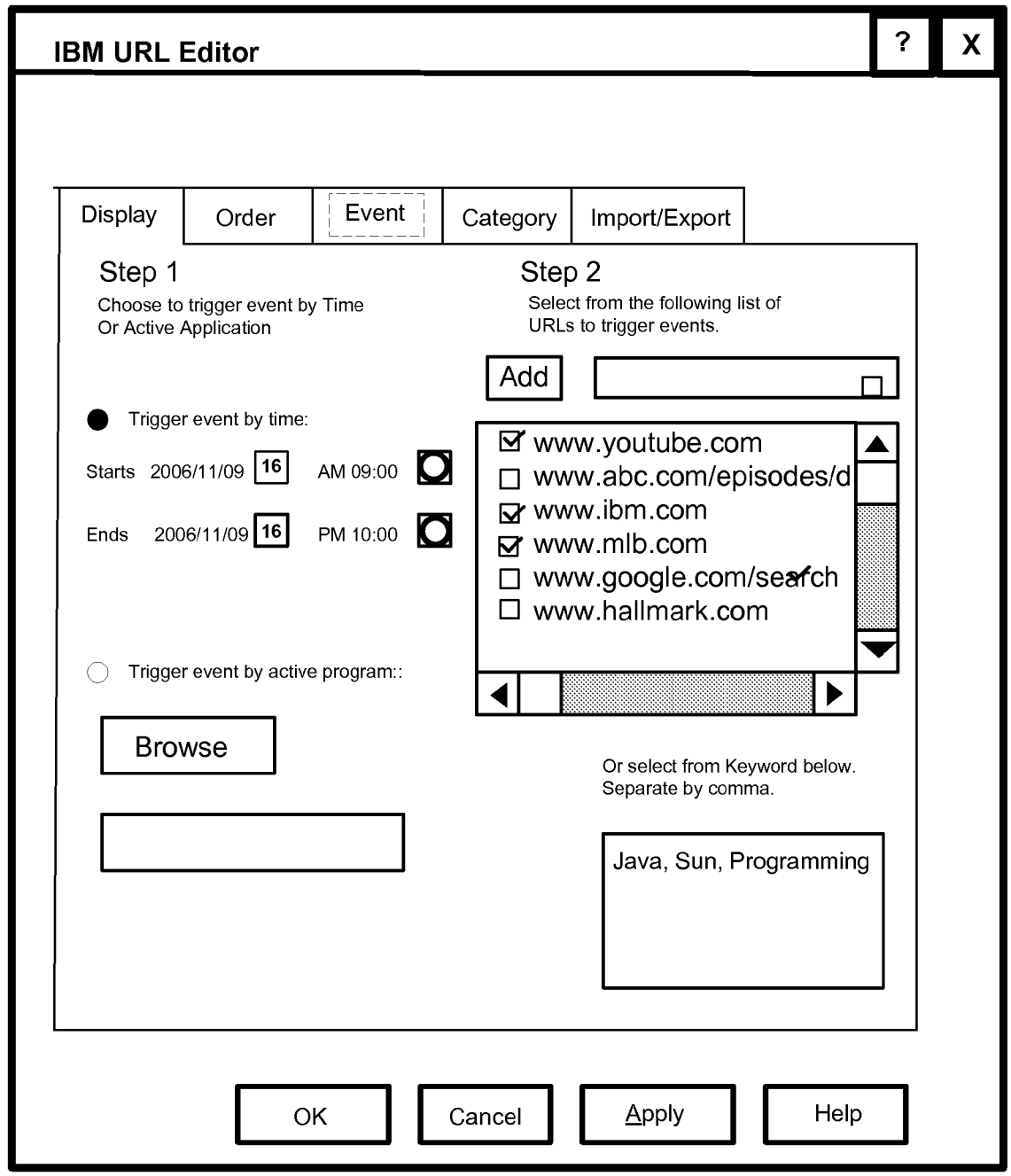
FIG. 19 is an illustration of a windows display for ordering the list in accordance with an event or in accordance with the present time.

FIG. 19 is a display of a window having commands that will enable the user to order the URL listings by either events or by time as previously discussed.

Figure 20:
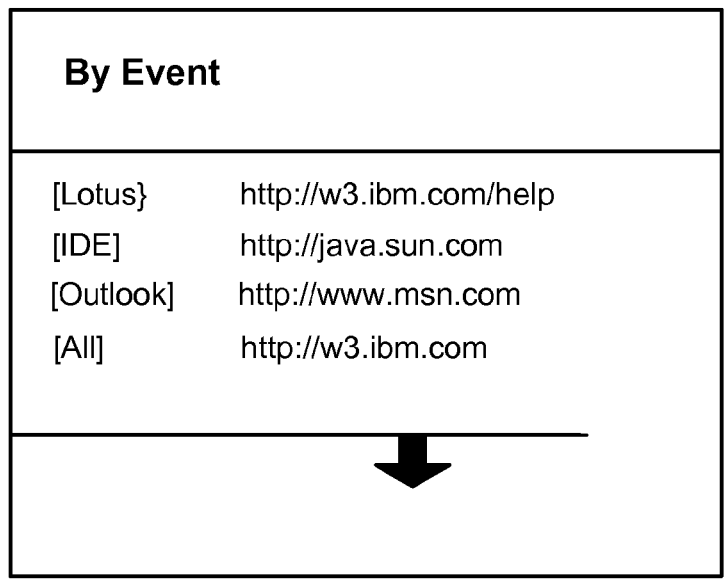
FIG. 20 is an illustration of an event generated display list.

FIG. 20 illustrates a list of web sites that would be displayed as a result of a grouping specified by an event. A simple example would be the activation of a Java program, where access to a Java web site might be useful as is illustrated in FIG. 20. Also, FIG. 20 illustrates an arrow located below the list representing the capability of the user to expand the list to display more than just the four list items shown.

Figure 21:
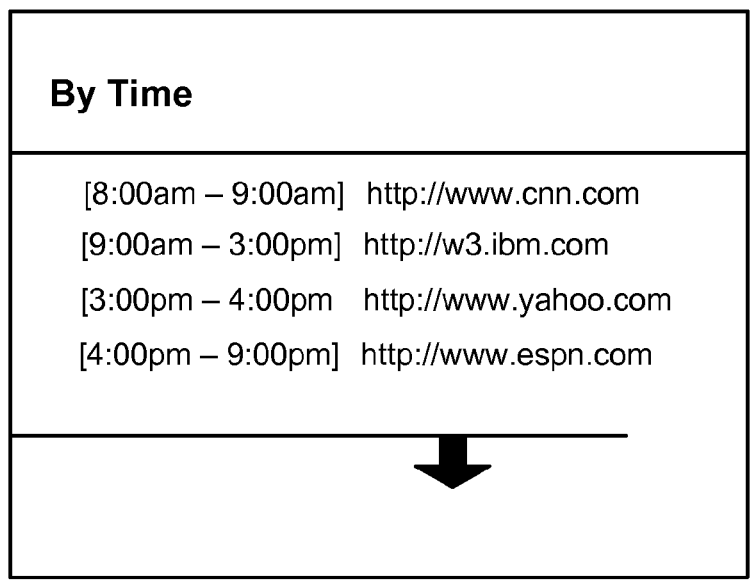
FIG. 21 is an illustration of a clock or time generated display list.

In a manner similar to that discussed above for FIG. 20, FIG. 21 illustrates a list of web sites that would be displayed to the user at the specified times. In other words, this is an example of the user having the capability to program the display of specific web sites on the list display to occur at the user specified times.

Figure 22:
FIG. 22 is an illustration of a list generated according to recent and frequently accessed elements.

FIG. 22 illustrates a list generated according to recent and frequently accessed web sites. In other words, the list of web sites is displayed according to the most recently accessed and also according to the most frequently accessed. This can be a very helpful display, since it will provide easy access to web sites that history has shown are most accessed.

Figure 23:
FIG. 23 is an illustration of a rule generated display list.
Figure 23:

FIG. 23 illustrates two list displays that would result from a rule-based configuration of display lists.

In this example, the rule would designate one list when the computer is connected to a home network (the Internet), and the rule would designate that a second list be displayed when the computer is connected to a company intranet. It clearly illustrates the usefulness and convenience provided to the user by displaying those list of web sites that would be appropriate for that network connection. It should be apparent to those skilled in the art that rules may extend beyond mere network connections and include other computational environments.

While particular embodiments of the present invention have been shown and described, it will be obvious to those skilled in the art that based upon the teachings herein, that changes and modifications may be made without departing from this invention and its broader aspects.

Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for managing a list of input data elements, the input data elements ordered in a first sequence in a first file, the method comprising the steps of:
   determining, by a computer, that a configuration file, required to have current settings describing how to order the input data elements in the list, does not exist and in response, copying, by the computer, the first file to form a second file having the input data elements ordered in the first sequence;
   after said coping the first file to form the second file, receiving, by the computer from a user, input specifying first settings of how to reorder the input data elements in the second file;
   in response to said receiving input specifying the first settings, generating, by the computer, the configuration file as a new file that coexists with the second file, said generating comprising setting the current settings in the configuration file to the first settings;
   after said generating the configuration file, loading, by the computer, the first settings from the configuration file and displaying, by the computer, the first settings that have been loaded;
   after said generating the configuration file, reordering, by the computer, the input data elements in the second file in accordance with the current settings in the configuration file;
   receiving, by the computer, display instruction to simultaneously display (i) the input data elements in the first file ordered in the first sequence and (ii) the input data elements in the second file ordered in accordance with the current settings in the configuration file; and
   in response to said receiving the display instruction, simultaneously displaying, by the computer in accordance with the display instruction, the input data elements in the first file and the input data elements in the second file.

2. The method of claim 1, further comprising:
   displaying, by the computer, a window comprising a first menu of commands for selection by the user to enable the user to select the first settings of how to reorder the input data elements in the second file, and in response, receiving, by the computer, the first settings selected by the user from the first menu,
   wherein the input received from the user is the first settings selected by the user from the first menu.

3. The method of claim 2, wherein the first menu in the window displays categories into which the input data elements in the second file may be distributed by the user, wherein the method further comprises:
   receiving, by the computer from the user, an indication of how to distribute the input data elements in the second file into the displayed categories, and in response, distributing, by the computer, the input data elements in the second file into the displayed categories in accordance with the indication,
   wherein the first settings selected by the user from the first menu specify how to sequentially order the categories.

4. The method of claim 3, wherein the input data elements are URL addresses, and wherein the distributing comprises distributing the URL addresses into the displayed categories.

5. The method of claim 1,
   wherein the first settings specify how to reorder the input data elements in the second file in accordance with both a recency of the input data elements in the second file and a frequency of previous access of the input data elements in the second file,
   wherein the reordering the input data elements in the second file comprises reordering the input data elements in the second file in accordance with both the recency and the frequency, and
   wherein the displaying the input data elements in the second file comprises displaying the reordered input data element in the second file such that each input data element in the second file is displayed along with the displayed input data element's recency and frequency.

6. The method of claim 1, further comprising:
   receiving, by the computer from the user, input specifying a change of the first settings to second settings of how to reorder the input data elements in the second file;
   modifying, by the computer, the configuration file, the modifying comprising changing the current settings in the configuration file from the first settings to the second settings; and
   loading, by the computer, the second settings from the configuration file and displaying the second settings that have been loaded.

7. A computer program product for managing a list of input data elements, the input data elements ordered in a first sequence in a first file, the computer program product comprising: one or more non-transitory computer readable storage devices and program code stored in the one or more computer readable storage devices, the program code comprising:
   program instructions to determine that a configuration file, required to have current settings describing how to order the input data elements in the list, does not exist and in response, to copy the first file to form a second file having the input data elements ordered in the first sequence;
   program instructions to receive, from a user after the first file has been copied to form the second file, input specifying first settings of how to reorder the input data elements in the second file;
   program instructions to generate, in response to having received the input specifying the first settings, the configuration file as a new file that coexists with the second file, said program instructions to generate comprising program instructions to set the current settings in the configuration file to the first settings;
   program instructions to, after the configuration file has been generated, load the first settings from the configuration file and display the first settings that have been loaded;
   program instructions to, after the configuration file has been generated, reorder the input data elements in the second file in accordance with the current settings in the configuration file;
   program instructions to receive a display instruction to simultaneously display (i) the input data elements in the first file ordered in the first sequence and (ii) the input data elements in the second file ordered in accordance with the current settings in the configuration file, and in response, to simultaneously display, in accordance with the display instruction, the input data elements in the first file and the input data elements in the second file.

8. The computer program product of claim 7, the program code further comprising:
program instructions to display a window comprising a first menu of commands for selection by the user to enable the user to select the first settings of how to reorder the input data elements in the second file, and in response, to receive the first settings selected by the user from the first menu,
wherein the input received from the user is the first settings selected by the user from the first menu.

9. The computer program product of claim 8, wherein the first menu in the window displays categories into which the input data elements in the second file may be distributed by the user, wherein the program code further comprises:
program instructions to receive, from the user, an indication of how to distribute the input data elements in the second file into the displayed categories, and in response, to distribute, by the computer, the input data elements in the second file into the displayed categories in accordance with the indication,
wherein the first settings selected by the user from the first menu specify how to sequentially order the categories.

10. The computer program product of claim 7,
wherein the first settings specify how to reorder the input data elements in the second file in accordance with both a recency of the input data elements in the second file and a frequency of previous access of the input data elements in the second file,
wherein the program instructions to reorder the input data elements in the second file comprise program instructions to reorder the input data elements in the second file in accordance with both the recency and the frequency, and
wherein the program instructions to display the input data elements in the second file comprise program instructions to display the reordered input data element in the second file such that each input data element in the second file is displayed along with the displayed input data element's recency and frequency.

11. A computer system for managing a list of input data elements, the input data elements ordered in a first sequence in a first file, the computer system comprising: one or more processors, one or more computer readable memories, one or more computer readable storage devices, and program code stored in the one or more computer readable storage devices for execution by the one or more processors via the one or more computer readable memories, the program code comprising:
program instructions to determine that a configuration file, required to have current settings describing how to order the input data elements in the list, does not exist and in response, to copy the first file to form a second file having the input data elements ordered in the first sequence;
program instructions to receive, from a user after the first file has been copied to form the second file, input specifying first settings of how to reorder the input data elements in the second file;
program instructions to generate, in response to having received the input specifying the first settings, the configuration file as a new file that coexists with the second file, said program instructions to generate comprising program instructions to set the current settings in the configuration file to the first settings;
program instructions to, after the configuration file has been generated, load the first settings from the configuration file and display the first settings that have been loaded;
program instructions to, after the configuration file has been generated, reorder the input data elements in the second file in accordance with the current settings in the configuration file;
program instructions to receive a display instruction to simultaneously display (i) the input data elements in the first file ordered in the first sequence and (ii) the input data elements in the second file ordered in accordance with the current settings in the configuration file, and in response, to simultaneously display, in accordance with the display instruction, the input data elements in the first file and the input data elements in the second file.

12. The computer system of claim 11, the program code further comprising:
program instructions to display a window comprising a first menu of commands for selection by the user to enable the user to select the first settings of how to reorder the input data elements in the second file, and in response, to receive the first settings selected by the user from the first menu,
wherein the input received from the user is the first settings selected by the user from the first menu.

13. The computer system of claim 12, wherein the first menu in the window displays categories into which the input data elements in the second file may be distributed by the user, wherein the program code further comprises:
program instructions to receive, from the user, an indication of how to distribute the input data elements in the second file into the displayed categories, and in response, to distribute, by the computer, the input data elements in the second file into the displayed categories in accordance with the indication, wherein the first settings selected by the user from the first menu specify how to sequentially order the categories.

14. The computer system of claim 11,
wherein the first settings specify how to reorder the input data elements in the second file in accordance with both a recency of the input data elements in the second file and a frequency of previous access of the input data elements in the second file,
wherein the program instructions to reorder the input data elements in the second file comprise program instructions to reorder the input data elements in the second file in accordance with both the recency and the frequency, and
wherein the program instructions to display the input data elements in the second file comprise program instructions to display the reordered input data element in the second file such that each input data element in the second file is displayed along with the displayed input data element's recency and frequency.

* * * * *